Dec. 8, 1970   HOMER E. NEWELL, ACTING   3,545,226
ADMINISTRATOR OF THE NATIONAL AERONAUTICS
AND SPACE ADMINISTRATION
DUAL SOLID CRYOGENS FOR SPACECRAFT REFRIGERATION
Filed Jan. 17, 1969                                2 Sheets-Sheet 1

INVENTORS
ROBERT P. CAREN
ROBERT M. COSTON

BY

ATTORNEYS

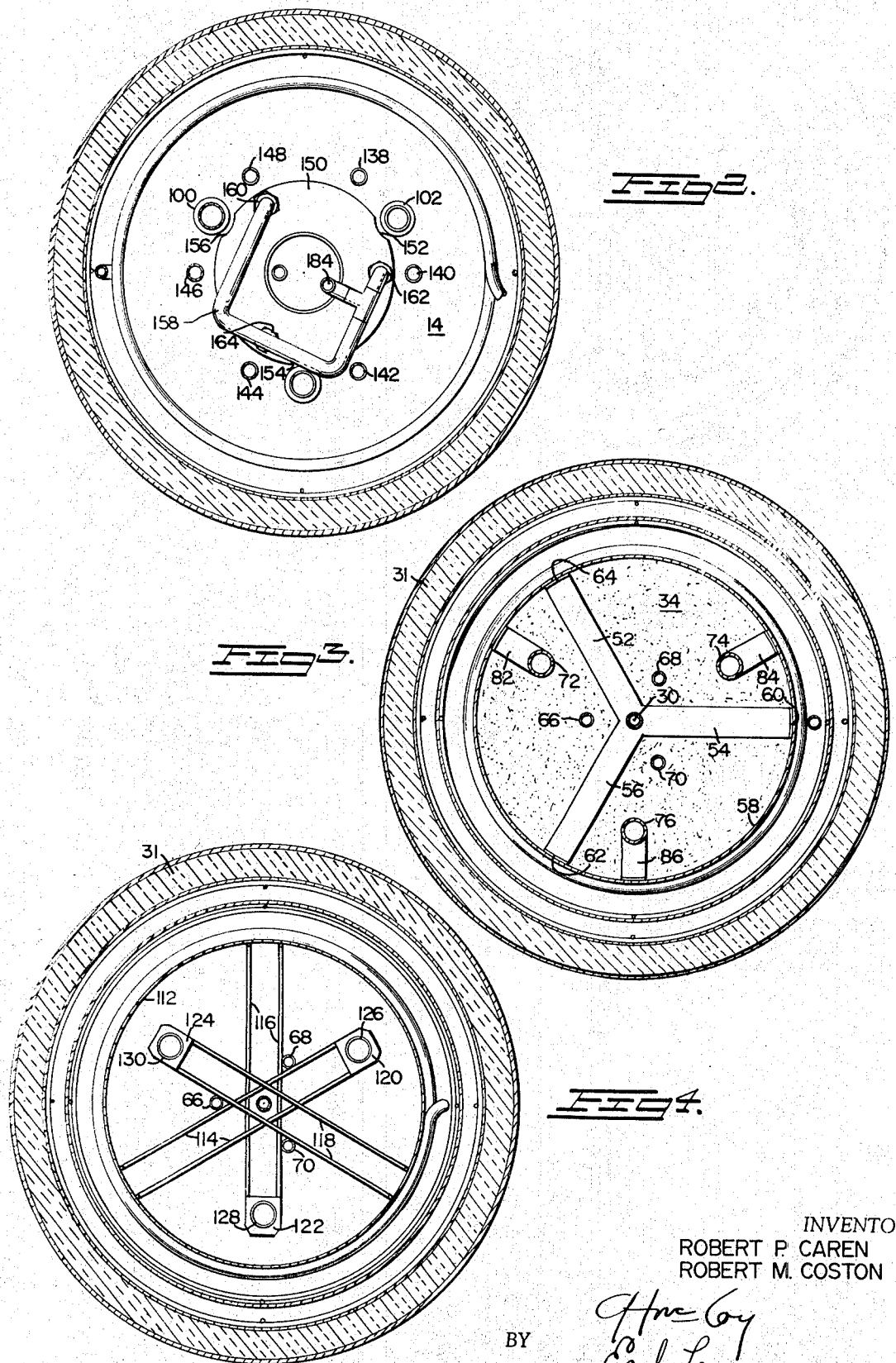

United States Patent Office 3,545,226
Patented Dec. 8, 1970

3,545,226
DUAL SOLID CRYOGENS FOR SPACECRAFT REFRIGERATION
Homer E. Newell, Acting Administrator of the National Aeronautics and Space Administration, with respect to an invention of Robert P. Caren, Palo Alto, and Robert M. Coston, San Jose, Calif.
Filed Jan 17, 1969, Ser. No. 791,888
Int. Cl. F25b *19/00;* F25d *3/12*
U.S. Cl. 62—384                                           6 Claims

ABSTRACT OF THE DISCLOSURE

A solid cryogen refrigeration system utilizing a second cryogen in combination with a surrounding multi-layer insulation encasing an evacuated cryogen container for thermal isolation thereof, a stable temperature level of the system being maintained by passive temperature regulation created by strict control over the venting rate of the subliming cryogen to the surrounding space environment.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates to a refrigeration system and, more particularly, to a solid cryogen refrigeration system utilizing a second cryogen in combination with a surrounding multi-layer insulation for thermally isolating the solid cryogen.

The invention is specifically designed to provide a solid argon cryogen refrigerator capable of maintaining an infrared detector at a stable temperature level of approximately 50° K. for an extended time period of one year.

BRIEF DESCRIPTION OF THE INVENTION

The argon refrigeration system according to the invention consists of a container filled with a solid argon cryogen and a heat exchanger which thermally couples the cryogen container to an infra-red detector which is maintained at a stable temperature of 50° Kelvin by the refrigeration system. Strict control over the venting rate of the cryogen as it sublimes to the surrounding space environment insures low temperature cooling for an extended time period. Additionally, to insure long duration cooling, all extraneous heat leaks are significantly reduced by thermally isolating the solid cryogen from its warm surroundings. More specifically, a second cryogen container, filled with solid carbon dioxide is provided in stacked relationship to the argon container and a multi-layer insulation surrounds the stacked containers to provide therefor a common surrounding vacuum environment. The solid carbon dioxide is characterized by a latent heat of sublimation approximately twice that of argon on either a volumetric or a mass basis. Accordingly, its use in a thermal isolation system according to the invention enables reduction in the amount of argon coolant required by a factor of three. The stacked containers are connected by glass reinforced epoxy tubes, which exhibit superior strength characteristics and relatively low thermal conductivity properties. The tubes are thermally grounded to the solid carbon dioxide container and maintain the stacked containers in spaced relationship to reduce ambient heat transfer therebetween via the conducting paths provided along the length of the epoxy tubes. The argon and carbon dioxide containers are surrounded by coils of Mylar tubing with stainless steel elbow portions to provide a heat exchanger for the introduction of liquid nitrogen which initially cools the containers as they are respectively pumped with argon and carbon dioxide gasses solidified by heat transfer to the heat exchanger containing the liquid nitrogen.

The argon container is thermally coupled to an elongated copper rod, embedded in the solid argon within the argon container and supporting an infra-red detector.

A radiation housing surrounds the argon container and comprises a copper foil enclosure overlying a structurally supporting framework of steel tubing. A plurality of nylon threads connect the argon container and the framework in order to support the radiation shield in suspension and in spaced relationsship with the argon container.

In order to support the radiation shield and the multi-layer insulation around the argon contaisner when the refrigeration system is subjected to high G forces, a cage fabricated from stainless steel tubing is structurally attached to the lower portion of the carbon dioxide container and surrounds the suspended radiation shield container in spaced relationship therewith.

The multi-layer insulation is formed over the carbon dioxide container protruding from the outer cage and around the outer cage in close proximity thereto.

The carbon dioxide container is generally annular in construction with a central opening being provided for receiving the filing lines associated with each of the carbon dioxide container, the argon container and the nitrogen heat exchanger. A tubular support column is affixed to the carbon dioxide container and supports and outer aluminum housing which encases the entire refrigeration system. The aluminum housing is provided with an infra-red transparent window adjacent the infra-red detector mounted on the elongated copper rod. The fill line for the argon container additionally acts as a vent for the subliming argon cryogen, the venting rate thereof being precisely controlled for maintaining the temperature of the argon at a desired level.

OBJECTS OF THE INVENTION

Thus, it is an object of the invention to provide a solid cryogen refrigeration system.

Another object of the invention is to provide a cryogen refrigeration system wherein the venting rate of the subliming cryogen to a surrounding space environment is precisely controlled in order to insure low temperature cooling for an extended time period.

It is yet another object of the invention to provide a solid cryogen refrigeration system which is thermally isolated from warm surroundings by a second cryogen and a surrounding multi-layer insulation.

A further object of the invention is to provide a solid cryogen container thermally coupled to an infra-red detector for maintaining the detector at a stable temperature level.

Still a further object of the invention is to provide a cryogen refrigeration system wherein a first cryogen container is maintained in stacked relationship with a second cryogen container, both containers being surrounded by a liquid nitrogen heat exchanger and a surrounding multi-layer insulation.

Yet a further object of the invention is to provide a cryogen refrigeration system wherein precise control of the solid cryogen utilized is achieved by providing a vent line of fixed conductance and having an orifice size and length which passively controls the vapor pressure over the solid argon corresponding to a solid argon temperature of 50° K., by venting to the surrounding atmosphere the proper gaseous argon mass flow rate corresponding to the temperature.

Other objects and many attendant advantages of the invention will become apparent upon a perusal of the following detailed description of the preferred embodiments of the present invention taken in conjunction with the drawings and the following detailed description thereof.

DESCRIPTION OF THE DRAWINGS

FIG. 2 is a section along the line 2—2 of FIG. 1;

FIG. 3 is a section along the line 3—3 of FIG. 1; and

FIG. 4 is a section generally along the line 4—4 of FIG. 1.

DETAILED DESCRIPTION OF THE PREFERRED EMBODIMENT

Figure 1:
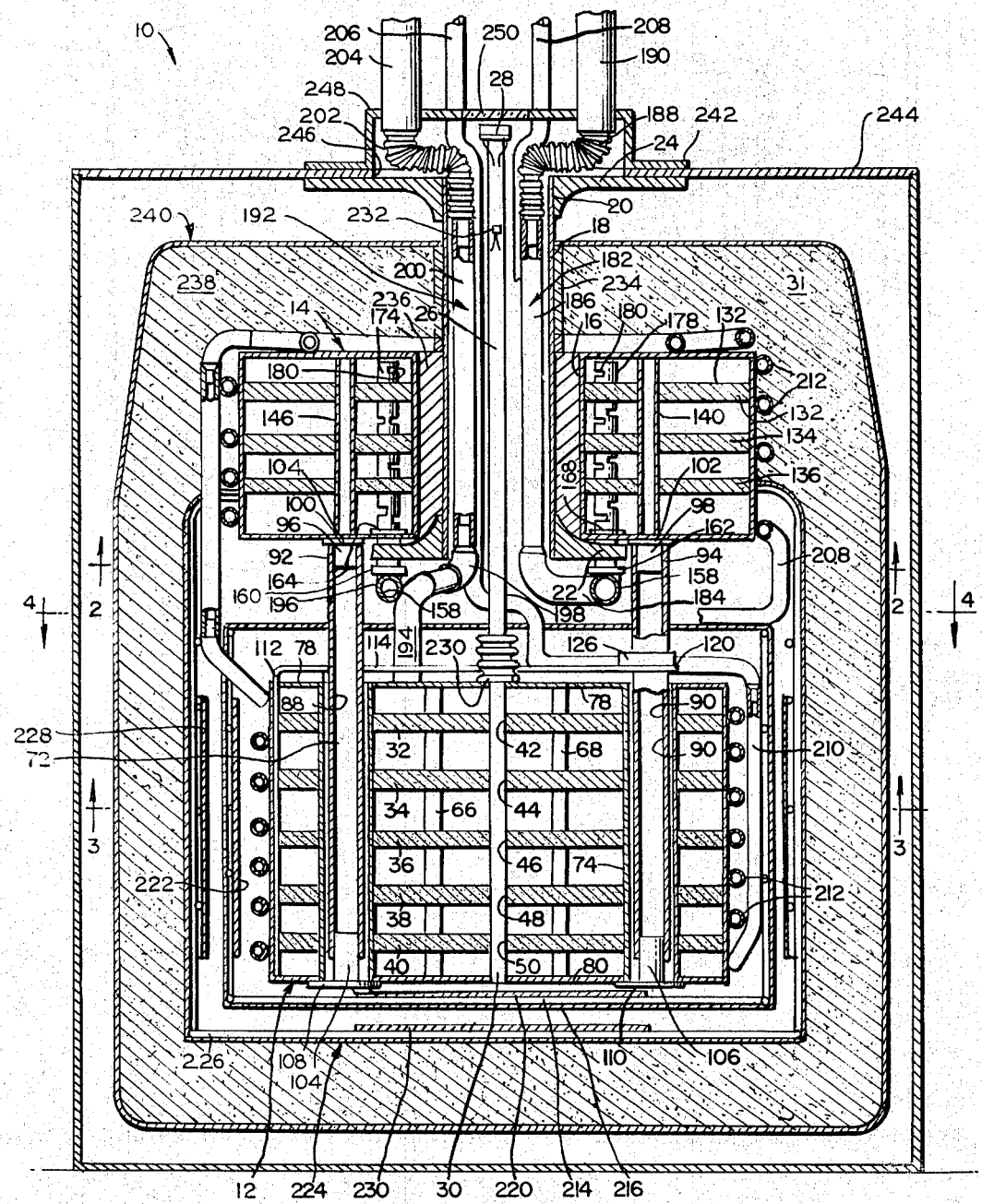
FIG. 1 is an elevation partially in section, illustrating the refrigeration system according to the invention.

With more particular reference to FIG. 1 of the drawings, there is illustrated generally at 10 a dual solid cryogen refrigeration system according to the invention. In the lower portion of the refrigeration system 10 is illustrated the primary coolant container 12 specially constructed to receive solid argon cryogen in a manner to be hereinafter described. The argon container 12 is generally cylindrical and fabricated, for example, from thin stainless steel sheets, providing wall thicknesses of .024 inch and end wall thicknesses of .03 inch. By way of example only, the argon container may be configured 8.2 inches in diameter by 5 inches in height. Maintained in spaced relationship above the argon container 12 is a secondary cryogen container 14 for containing carbon dioxide cryogen. The carbon dioxide container 14 is generally annular in construction, having a central opening indicated at 16 and fabricated from thin stainless steel sheets providing side wall thicknesses of .024 inch and end wall thicknesses of .03 inch, for example. By way of example, the carbon dioxide container 14 may have an outer diameter of 9.2 inches and a height of 4.25 inches. Received in the central opening 16 of the container 14 is a primary support column 18 comprising, for example, a glass filament reinforced epoxy resin tube having an internal diameter of 1.728 inches. In order to provide minimum heat conduction therealong, the support column 18 may have a tapered wall having a thickness of 0.045 inch at its lowermost end and a thickness of 0.012 inch at its uppermost end, generally indicated at 20, which protrudes from the confines of the carbon dioxide container 14.

Surrounding the lowermost end of the primary support column 18 is a generally annular flange 22 extending radially of the cylindrical support column 18. The carbon dioxide container 14 is fixedly supported on the flange 22 in a manner to be hereinafter described in detail. The upper end 20 of the support column 18 is surrounded by and secured to, by epoxy, for example, an annular flange 24 extending radially of the column 18. The flange 24 provides a bearing surface for securing the dual solid cryogen refrigeration system 10 to a spacecraft, as well as providing a mounting for other structure to be described hereinafter.

Retained centrally within the support column 18 and extending axially therethrough is an elongated copper rod 26. Retained on the uppermost end of the copper rod 26 is an infra-red detector 28. The lowermost end portion 30 of the copper rod 26 extends centrally through the argon container 12 where it is fixedly secured therein in intimate thermal contact with the cryogen in a manner to be hereinafter described in detail. Shown surrounding the two containers is a jacket of insulating material 31.

Thus far, what has been described is the general relationship of the primary components of the dual solid cryogen refrigeration system 10. The argon container 12 contains a solid argon cryogen in intimate thermal contact with the copper rod 30 which provides a thermal link between the container 12 and the infra-red detector 28 which must be maintained at a low temperature level in order to avoid the detection of extraneous surrounding radiation. The carbon dioxide container 14 containing a solid carbon dioxide cryogen, together with the multi-layer insulation 31, thermally isolates the cryogen container 12 from its relatively warm surroundings.

A more detailed description of the above-described components will follow, together with a detailed description of the structure associated therewith and comprising the preferred embodiments of the invention.

FIG. 1, taken in conjunction with FIG. 3, illustrates the argon container 12 being provided interiorly with five vertically spaced foamed metal plates 32, 34, 36, 38 and 40. In a preferred embodiment, for example, each plate may comprise a quarter-inch thick foamed copper plate 8 inches in diameter having a 0.060 pore size. The copper thermal link 30 extends centrally through each of the plates 32–40, the plates surrounding the thermal link 30 and being soldered thereto along the surrounding contact areas, indicated generally at 42, 44, 46, 48 and 50. The plates thereby provide a heat exchanger internally of the argon container 12, insuring good heat transfer from the copper thermal link 30 along each of the plates and to the argon cryogen within the container 12. As shown in FIG. 3, which is a section along 3—3 of FIG. 1 and particularly illustrating the internal structure of the container 12, the foamed metal plate 34 is supported by three radially directed straps of the thin metal plates 52, 54 and 56. The plates are joined to the centrally extending shaft 30, by hard soldering, for example, and also to the inner side wall 58 of the container 12 along their outer terminal edges 60, 62 and 64. It should be understood that each of the plates 32, 34, 36, 38 and 40, are provided with like straps which are provided to support the plates in vertically spaced positions within the container 12.

With reference yet to FIGS. 1 and 3, three stainless steel reinforcing tubes 66, 68 and 80 are equally spaced radially of the centrally extending thermal link 30 and are soldered to the plates 32, 34, 36, 38 and 40 along their respective mutual contact areas. It should be understood that additional reinforcing tubes, similar to the tubes 66, 68 and 70, may be provided internally of the container 12. However, for purposes of clarity in illustration, such additional reinforcement tubes are not illustrated.

With further reference to FIGS. 1 and 3, the container 12 is provided with a plurality of radially spaced sleeves 72, 74 and 76, which sleeves are in parallel relationship with the extended copper link 30 and which communicate, as shown in FIG. 1, with the end walls 78 and 80 of the generally cylindrical container 12. With reference to FIG. 3, if desired, metal straps 82, 84 and 86 may be associated with the sleeves 72, 74 and 76.

As more particularly illustrated in FIG. 1, each of the sleeves 72, 74 and 76 receives a glass fiber reinforced tubular column, such as the columns 88 and 90, received by the sleeves 72 and 74, respectively. The topmost end portions 92 and 94 of the columns 88 and 90 are shown in FIG. 1 as secured to and thermally grounded to the solid carbon dioxide container 14. More specifically, each of the support columns 92 and 94 are received over bushings 96 and 98, respectively, the bushings having an integral flange 100 and 102, respectively, secured in any well-known manner to the bottom wall of the carbon dioxide container 14. The flanges, together with their associated bushings, thermally ground the glass reinforced tubular columns 88 and 90 to the bottom of the container 14. Similarly, the bottom ends of the columns 88 and 90 are received over flanged bushings 104 and 106 provided with flanges 108 and 110, respectively. The solid argon container 12 is supported on the flanges 108 and 110, thereby maintained in spaced relationship from the carbon dioxide container 14. Sufficient clearance is provided between each of the tubular support columns, such as the columns 88 and 90 illustrated in FIG. 1, and the associated sleeves, such as the sleeves 72 and 74, in order to prevent unnecessary heat transfer between the support columns and the argon container 12.

Accordingly, the glass reinforced tubular columns, such as the columns 88 and 90, exhibit superior strength characteristics, in order to support the argon container 12, and possess relatively low thermal conductivity characteristics. The support columns maintain the containers 12 and 14 in spaced relationship to reduce ambient heat transfer therebetween, the elongated lengths of the columns providing long thermal path lengths therealong to further reduce ambient heat transfer to the argon container 12.

Reference will now be made more particularly to FIGS. 1 and 4, the latter figure being a section along the line 4—4 of FIG. 1. The container 12 is provided along its upper peripheral margin with an upstanding lip 112. Secured to the lip are spaced pairs of extended rods 114, 116 and 118. The pairs of rods are provided at their outer terminal extended ends with flanges 120, 122 and 124, respectively. The flanges are provided with integral upwardly directed sleeves 126, 128 and 130, respectively. As shown in FIG. 1, the pair of arms 114, secured to and extending from the upraised lip 112, are retained in spaced relationship, generally horizontally overlying the top wall 78 of the argon container 12. The sleeve 126 associated with the flange 120 surrounds the tubular support column 90, without engaging said column.

In a similar fashion, not shown, the remaining pairs of arms 116 and 118 are horizontally disposed in spaced relationship above the top wall 78 of the container 12, the sleeves 128 and 130 also surrounding without touching a respective tubular support column, such as the column 88, for example. The extended arms 114, 116 and 118, together with the structure associated therewith, provide a restraining system for preventing movement of the argon container 12 under lateral load conditions, such as the load conditions experienced during launch of a spacecraft to which the refrigeration system 10 may be suitably attached. Only when lateral loads are present do the sleeves 126, 128 and 130 respectively engage a tubular support column, such as the columns 88 and 90, in order to restrain the container 12 from lateral motion. Under any other loading conditions, the pairs of arms 114, 116 and 118, are specifically disposed in close proximity to the bottom of the carbon dioxide container 14 and the top of the argon container 12, contact therebetween being prevented in order to reduce the possibility of heat transfer in directions away from the containers.

With more particular reference now being made to FIGS. 1 and 2, the details of the structure associated with the carbon dioxide container 14 will now be described. The carbon dioxide container 14 is provided interiorly with three vertically spaced, annular foamed metal plates 132, 134 and 136. The plates are similar in construction to the plates 32, 34, 36, 38 and 40, provided interiorly of the argon container 12. The interior of the carbon dioxide container 14 is provided with tubular supports 138, 140, 42, 144, 146 and 148, as shown in FIG. 2. FIG. 1 particularly illustrates two of the reinforcing tubes 146 and 140 extending from the bottom wall to the top wall of the container 14 and extending through each of the foam metal plates 132, 134 and 136, and being soldered thereto. Accordingly, the reinforcing tubes 138, 140, 142, 144, 146 and 148 are similar in construction to the tubes 66, 68 and 70 associated with the argon container 12. For example, the tubes may be one-quarter inch in diameter and spaced equally on a six and one-quarter inch diameter circle, as illustrated in FIG. 2.

With reference yet to the FIGS. 1 and 2, the vent and fill line for the carbon dioxide container will be described.

As shown in FIG. 2, a generally circular header 150 is secured to the bottom wall of the container 14. The header 150 is provided with recessed portions 152, 154 and 156 adjacent each of the flanged bushings, such as the bushings 100 and 102. A generally U-shaped pipe network 158 is provided in communication with the header plate 150. More particularly, with reference to FIGS. 1 and 2, three externally threaded reducer fittings capped by a hexagonal nut are illustrated at 160, 162 and 164 in FIG. 2. FIG. 1 particularly illustrates the externally threaded reducer fittings 160 and 162 in elevation. It should be understood that the fittings are connected at spaced points along the U-shaped pipe network 158 as illustrated in FIG. 2 and, as shown in FIG. 1, project upwardly from the pipe network 158 through the bottom wall of the container 14. The fittings are secured in hexagonal nuts which are secured to the inner surface of the bottom wall of the container 14. For example, as shown in FIG. 1, the reducer fitting 160 is soldered to the hexagonal nut 164 and the reducer fitting 162 is soldered to the hexagonal nut 168. Accordingly, the threaded reducer fittings provide communication between the pipe network 158 and the interior of the carbon dioxide container 14.

Secured to each of the hexagonal nuts, for example the hexagonal nuts 164 and 168, is a section of stainless steel tubing, each section projecting upwardly interiorly of the container 14. For example, the hexagonal nut 164 has secured thereto an upwardly projecting length of pipe 174 and the hexagonal nut 168 is provided with a similar length of pipe 178. It should be understood that the reducer fitting 164 is similarly provided with the structure associated with the reducer fittings 160 and 162, as described. The upwardly projecting pipes, such as the pipes 174 and 178, are provided with a plurality of notches 180 which provide communication of the interior of the carbon dioxide container 14 with the interior of the reducer fittings, such as the fittings 160 and 162.

As shown in FIG. 1, an inlet pipe 182 extends axially and within the hollow main support column 18. The inlet pipe 182 is fabricated with a stainless steel elbow section 184 and Mylar straight tubing section 186 joined thereto. A flexible hose 188 routes the Mylar tubing section 186 through a topmost portion 20 of the fiber glass support column and is secured, for example, to an inlet pipe 190. An inlet and venting line 192 is provided for the argon container 12 and is similar in construction to the inlet and fill line 182 associated with the carbon dioxide container 14. More particularly, the inlet and fill line 192 is provided with a stainless steel elbow section 194 connected to the top of the container 12. A straight pipe section 196 connects the elbow section 194 to a second stainless steel elbow section 198. An elongated length of Mylar tubing 200 adjoining the elbow 198 and extends axially within the hollow support column 18. A length of rubber hose 202 connects the top of the Mylar tube 200 to an outlet-inlet pipe 204.

Additional fill and vent pipes 206 and 208 for liquid nitrogen are located adjacent to the fill and vent lines 190 and 204. The pipes 206 and 208 are respectively connected to fill and vent lines similar in construction to the fill and vent lines 182 and 192. The pipe 206 is connected to a fill and vent line 210, as shown in the lower portion of FIG. 1, to a first heat exchange comprising a stainless steel tubing heat exchanger 212 configured in coils wrapped spirally upwardly about the cylindrical periphery of the nitrogen container 12. The coils 212 are soldered to the exterior of the container 12. The fill and vent line 210 associated with the pipe 206 is fabricated with stainless steel elbow sections and Mylar tubing straight sections, and thereby similar in construction to the fill and vent lines 182 and 192. The straight sections of the fill and vent lines, being made of Mylar, reduces solid phase heat transport therealong. Additionally, sufficient clearance is provided for routing the fill and vent lines to prevent thermal shorts between the argon and carbon dioxide containers.

A thermal radiation barrier 214 surrounds the argon container 12 and is fabricated with a structurally supporting framework of $\frac{1}{16}$ inch diameter steel tubes bonded together in mesh configuration using inert gas welding techniques. A single layer 216 of 1.5 mil copper foil completely covers the exterior of the framework for providing a thermal radiation shroud completely enclosing the argon container 12. Openings are provided in the radiation shield for receiving the support columns, such as the columns 88 and 90, and the argon and carbon dioxide fill and vent lines, the liquid nitrogen fill and vent lines, and the thermal link 30.

A plurality of Teflon pads, for example the pads 220 and 222 illustrated in FIG. 1, are secured to the inner surface of the framework 216 in order to suppress vibration of the argon container 12 under lateral loading conditions. For example, the radiation container may be maintained in spaced relationship from the container 12 in order to prevent thermal contact therebetween by a plurality of nylon threads, not shown, connected between the argon container 12 and the framework 216, thereby supporting the radiation container in suspension and enclosing the argon container 12. A second radiation container 224 completely encloses the radiation container 214 and the bottom portion of the carbon dioxide container 14. More particularly, the container 224 is fabricated similar to the container 214 in that a framework 226 of 1/16 inch diameter steel tubing underlies a covering comprising a single layer of 1.5 mil copper foil upon the exterior of the framework. Both the framework and the copper foil are soldered to the exterior of the carbon dioxide container to provide a good thermal contact therebetween, the carbon dioxide container supporting the radiation container 224.

Additionally, the container 224 is provided with Teflon pads, such as the pads 228 and 230 mounted on the interior of the framework 226 for supporting the first-mentioned radiation container 214 and the argon container 12. The outer radiation container 224 thus provides an insulated environment completely enclosing the argon container 12 and bounded by the bottom portion of the carbon dioxide container 14. For example, the second radiation container 224 insures a long existing maintenance of a desired argon temperature of 50° K. For example, the outer radiation container 224 in a preferred embodiment of the invention is maintained at a spacing of ½ inch from the inner radiation container 214.

A stainless steel bellows 230 forms an expandable vacuum seal between the top of the argon container 12 and the cylindrical periphery of the thermal link 30. The bellows additionally compensates for dimensional differences between the container and the thermal link due to uneven thermal expansion or contraction during cooling of the container 12. A platinum resistor 232 is soldered to the top portion 26 of the thermal link 30 in order to monitor the infra-red detector temperature. Surrounding the upper portion of the support column in the vicinity of the platinum resistor 232 is a quarter inch wide, spirally wrapped intermediary insulation material 234. The insulation material utilized in a preferred embodiment of the invention is the well-known Dexiglas. As shown, the insulation is wrapped spirally about the upper portion of the glass fiber reinforced support column which protrudes from the top of the carbon dioxide container. The insulation is provided particularly to reduce solid phase thermal conduction between the support column and the edge of a surrounding multi-layer insulation, the details of which will be hereinafter described.

The lower portion of the support column which is received within the annular configuration of the carbon dioxide container 14, is spirally wrapped with additional insulation material 236. The insulation material 236 completely fills the annular space between the lower portion of the support column 18 and the carbon dioxide container 14.

Completely surrounding the heretofore described structure is a multi-layer insulation, generally indicated at 238 and comprising a two-inch thick mantle of insulation for thermally isolating the copper outer container 224 and the carbon dioxide container from warm surroundings.

For example, the insulation 238 may comprise spirally wrapped layers of Dexiglas applied according to the following technique. In a preferred embodiment, a continuous length of Dexiglas 36 inches wide is wrapped circumferentially about the containers 14 and 224 and their associated structure, the insulation overhanging equally the top of the carbon dioxide container 14 and the bottom of the container 224. The top and bottom of the containers, respectively, are covered by the overhanging insulation according to a displaced Gore technique. More specifically, the end overhanging insulation layers are provided with triangular cut-outs so that the apices of each cut-out terminates at the refrigerator center. Accordingly, the overhanging insulation layers are configured in large serrations which, when folded over the ends of the containers, the serrations butting together along their adjacent edge configurations leaving no space therebetween. For example, the ends of the triangular serrations covering the top of the carbon dioxide container 14 may be truncated to conform to the spirally wrapped zone of insulation 234. The serrated insulation layers are retained in a folded position by applying adhesive backed Mylar tape. For example, each ten layers of the serrated insulation ends are taped and then are covered by a disk of Dexiglas.

After approximately 150 spirally wrapped layers are applied, the serrated portions thereof are covered with a one-inch thickness of Dexiglas disks, some of which are provided with a center hole to fit tightly around the insulation layer 234 at the top portion of the fiber glass support column 18. All of the disks isolate the refrigerator interior from radiation tending to leak through the serrations provided in the insulation. For example, the electrical leads from the platinum resistor 232 and the infra-red detector 28 can be worked out from the interior of the refrigerator through the serrations of the insulation, the insulation serving to thermally ground the leads to the various insulation layers and thereby reduce heat leaks through these leads.

The insulation layer 238 is surrounded by an aluminum outer container 240, the top of the container 240 surrounding a protruding top portion of the column 18. The container 240 is evacuated to provide a surrounding vacuum environment for the containers 12 and 14. Accordingly, the insulation layer 238 thus comprises insulation in a vacuum environment for thermally isolating the refrigerator from its warm surroundings.

A main support flange 242 is epoxied to the protruding top portion of the support column 18. For example, the flange may be 6½ inches in diameter and provides the main support flange for securing the refrigerator to an outer protective casing 244 which surrounds and protects the evacuated container 240.

By way of example, the casing 244 may be provided with a central circular opening 246 which is covered by a cover plate 248. The cover plate 248 receives the inlet-outlet pipes 190, 204, 206 and 208 therethrough, the pipes being sealed to the cover plate 248. Centrally of the cover plate 248 is an Itran window 250 immediately adjacent the infra-red detector 28. The window 250 is infra-red transparent to enable effective operation of the detector 28.

The following method is used for producing a high density argon solid within the container 12. Gaseous argon is introduced through the inlet-outlet pipe 204 and is introduced to the interior of the container 12 through the fitting 194. The walls of the container 12 are cooled by liquid nitrogen introduced through the fill and vent line 206 and circulated through the coils 212 of the heat exchanger. The argon gas is liquefied by the circulating liquid nitrogen and is subsequently cooled to a solid phase. By maintaining the introduced argon gas at a pressure of approximately 514 torr, voids which occur due to contraction of the solid are continually filled by additional solid phase cryogen. The argon gas passes through the pores of the plates 32-40 to completely fill the container 12.

In a similar manner, high density solid phase carbon dioxide is produced in the container 14. Carbon dioxide is introduced to the container 14 through the fill and vent line 190. The liquid nitrogen circulating through the coils 212 surrounding the container 14 produces a high density solid carbon dioxide directly from the vapor phase. The solid carbon dioxide is grown on the periphery of the container adjacent to the heat exchanger coils, thereby preventing blocking of the entrance manifold until the container is filled with solid cryogen. In practice, the relatively warm incoming vapor also prevents blocking of the carbon dioxide inlet manifold.

The solid carbon dioxide is characterized by a latent heat of sublimation of approximately twice that of argon on either a volumetric or mass basis. Accordingly, its use in the thermal isolation for the solid argon enables reduction in the required argon coolant by a factor of three.

Control of the solid argon temperature is achieved through a totally passive temperature regulation scheme, thereby eliminating heretofore used mechanical pressure actuated mechanisms which actively control the vapor pressure over the solid argon. The passive temperature regulation system is inherent in the fill and vent line 204 of the argon container 12. The vent line is of a fixed conductance and leads to the vacuum space environment. The vent line 204 is sized specifically in accordance with experiments conducted so that a pressure drop corresponding to a solid argon temperature of 50° K. provides the proper gaseous mass flow rate given off upon sublimation. If the heat flow from the infra-red detector changes, the heat input to the solid argon cryogen changes. Accordingly, the mass flow rate of the subliming argon temperature changes to maintain the desired 50° K. temperature. Thus, the specifically sized fill and vent line, determined by experiment to be approximately 3/8 inch in internal diameter, allows a change of vapor pressure over the cryogen to permit a new mass flow rate. By experiment, it was found that the subliming cryogen refrigeration system according to the invention is effective for maintaining a desired temperature level up to one year in duration.

Obviously, other modifications of the invention may be made without departing from its scope. For example, the argon container may be gold plated to reduce its emissivity. The nitrogen heat exchanger coils could be placed within the confines of the containers 12 and 14 to result in a smooth exterior container wall, thereby decreasing inter-reflecting radiant energy. Additionally, the weight of solder used to join the externally provided exchanger tubes would be eliminated. Also, methane may be used in place of argon as a primary cryogen coolant.

What is claimed is:

1. A dual cryogen refrigeration system for maintaining an instrument at a predetermined, stable temperature comprising:
   (a) a first cryogen container having a quantity of a first subliming cryogen material therein, the operational temperature phase of said first solid cryogen encompassing the predetermined temperature of the instrument;
   (b) means for thermally coupling said instrument and said first solid cryogen;
   (c) a second cryogen container having a quantity of a second subliming cryogen material therein, said second cryogen container being thermally isolated from said first cryogen container and placed between said first cryogen container and said instrument, said second subliming cryogen having a higher subliming temperature and having a greater latent heat of sublimation than said first subliming cryogen;
   (d) heat exchanger means in contact with said first and second cryogen containers to effectuate the initial solidification of said first and second cryogens as they are pumped into said first and second containers;
   (e) insulation means surrounding both said first and second cryogen containers and said heat exchanger means;
   (f) means in communication with said first cryogen container to control the mass flow rate of said first solid cryogen for maintaining the temperature of said first cryogen at a desired level; and
   (g) means enveloping said first and second cryogen containers and said insulation means, said enveloping means being evacuated to provide a surrounding vacuum environment for said first and second cryogen containers and said insulation means.

2. The structure of claim 1 wherein said system further comprises means in communication with said second cryogen container to facilitate sublimation of said second cryogen.

3. The structure of claim 1 wherein said second cryogen has a latent heat of sublimation approximately twice that of said first cryogen on either a volumetric or mass basis such that said second cryogen acts as a thermal barrier between said instrument and said first cryogen to stabilize the temperature of said first cryogen.

4. The structure of claim 3 wherein said first cryogen is solid argon and said second cryogen is solid carbon dioxide.

5. The structure of claim 1, and further including: caging means surrounding said first container for supporting said first container under lateral loads.

6. The structure of claim 1, and further including a plurality of glass fiber reinforced epoxy columns suspending said first container from said second container.

References Cited

UNITED STATES PATENTS

| | | | |
|---|---|---|---|
| 1,863,958 | 6/1932 | Wulff et al. | 62—54X |
| 2,671,154 | 3/1954 | Burstein | 62—514X |
| 3,066,222 | 11/1962 | Poorman et al. | 62—514X |
| 3,122,004 | 2/1964 | Aberle et al. | 62—514X |
| 3,289,423 | 12/1966 | Berner et al. | 62—45 |
| 3,350,229 | 10/1967 | Justi | 62—48X |

FOREIGN PATENTS

| | | | |
|---|---|---|---|
| 1,394,155 | 2/1965 | France | 62—45 |

ALBERT W. DAVIS, JR., Primary Examiner

U.S. Cl. X.R.

62—46, 47, 54, 514; 165—185; 220—9